July 14, 1942.   A. A. GROTHE   2,289,836
CONTROLLING CIRCUITS FOR ALTERNATING CURRENT
Filed Jan. 5, 1939    3 Sheets-Sheet 1

INVENTOR
Arthur A. Grothe
BY
ATTORNEYS

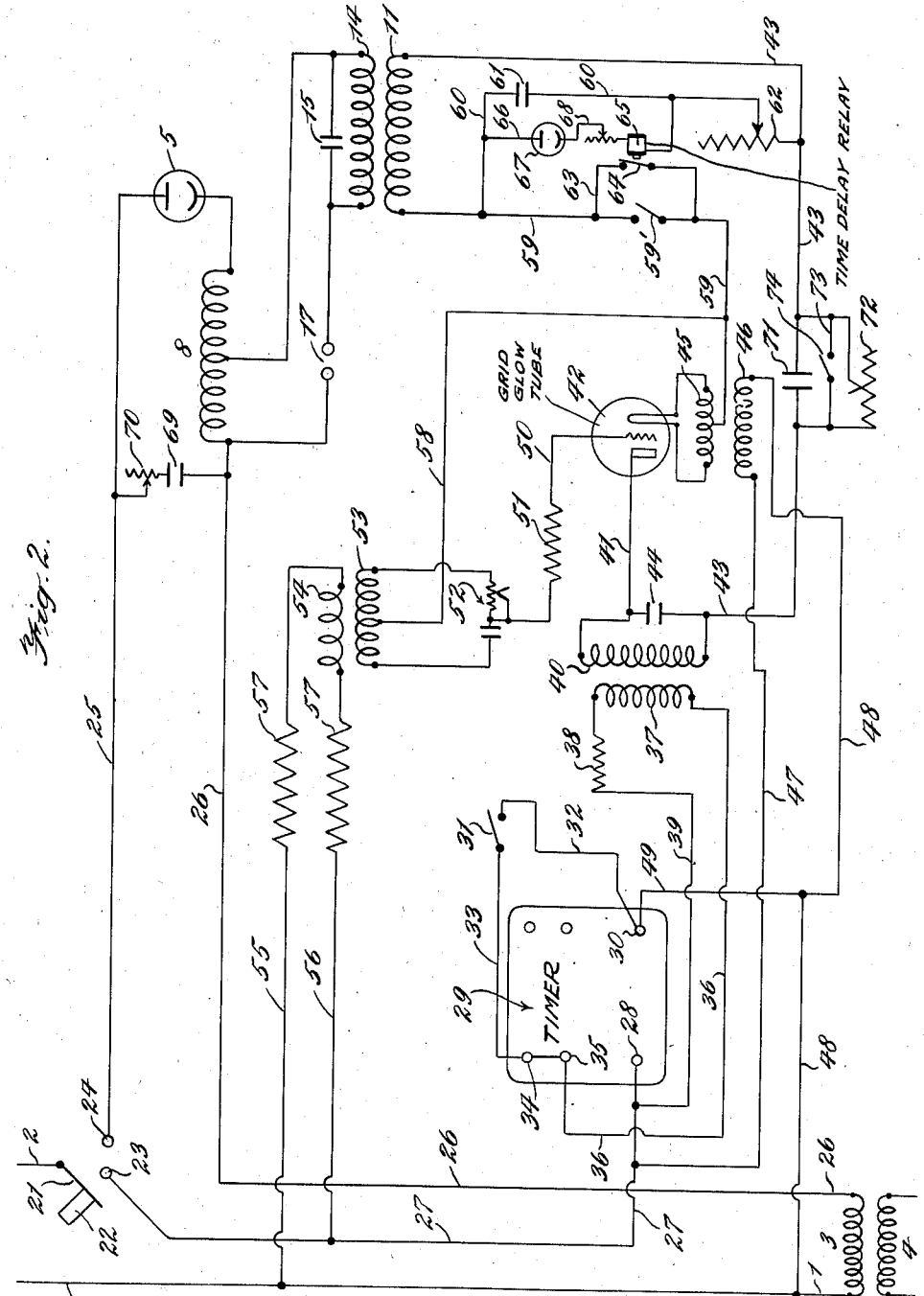

July 14, 1942.　　　A. A. GROTHE　　　2,289,836
CONTROLLING CIRCUITS FOR ALTERNATING CURRENT
Filed Jan. 5, 1939　　　3 Sheets-Sheet 3
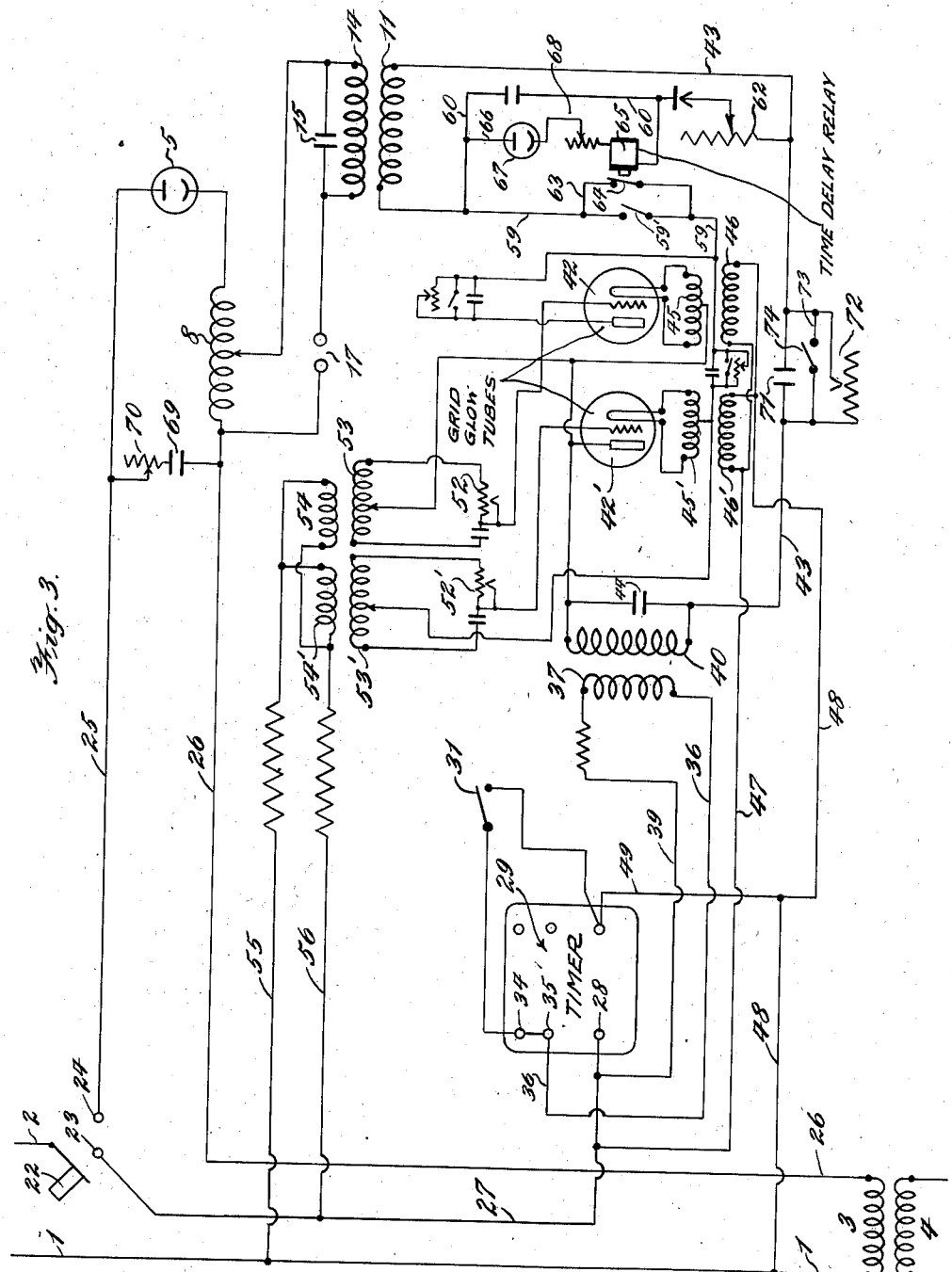
INVENTOR
*Arthur A. Grothe*
BY
*Gifford, Scull & Burgess*
ATTORNEYS Patented July 14, 1942

2,289,836

UNITED STATES PATENT OFFICE 2,289,836

CONTROLLING CIRCUIT FOR ALTERNATING CURRENTS

Arthur A. Grothe, Chicago, Ill., assignor to American Electric Fusion Corporation, Chicago, Ill., a corporation of Illinois Application January 5, 1939, Serial No. 249,429

8 Claims. (Cl. 250—27)

This application covers certain circuits designed to control alternating currents, and the novel features will be best understood from the following description and the annexed drawings, in which I have shown selected circuits adapted to furnish the desired controls.

Fig. 2 is a wiring diagram of a circuit which may be used in conjunction with part of Fig. 1.

Fig. 3 is a wiring diagram illustrating a circuit which is generally similar to that of Fig. 2, but is different therefrom in certain particulars.

Figure 1:
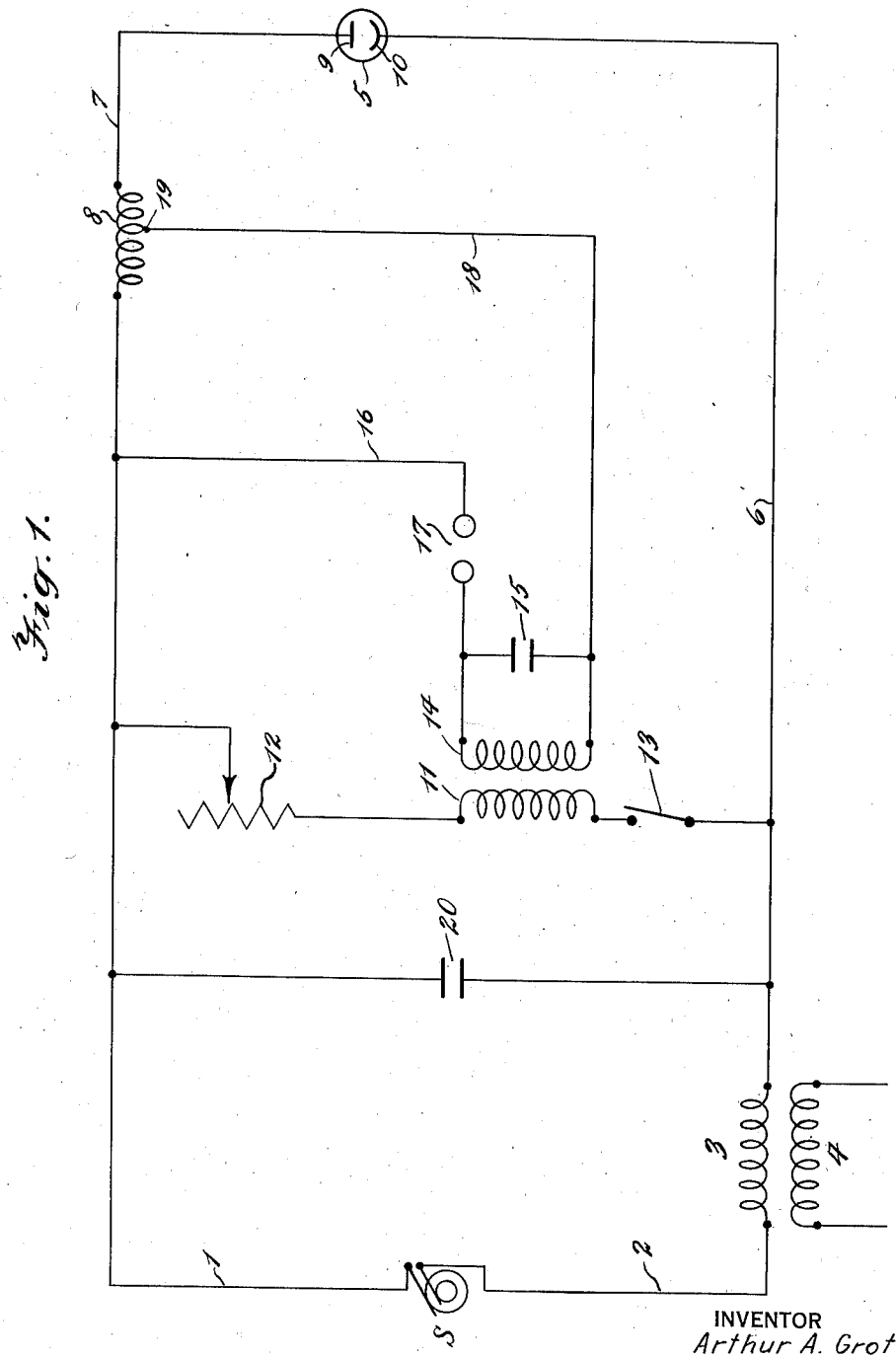
Fig. 1 is a wiring diagram of one circuit.

Referring first to Fig. 1, for purposes of illustration, I have shown a circuit in which alternating current is supplied from any suitable source S through the main leads 1 and 2 and this current may be used to energize the primary 3 of a welding transformer, the secondary of which is indicated at 4. This transformer may be used to apply current to welding electrodes in a manner well known in the art and is selected as an example of a load, which, however, may take any other form, so far as this invention is concerned.

The circuit through the primary 3 includes a tube switch 5 which is connected to one end of the primary 3 by the conductor 6 and which is connected to the lead 1 by means of a conductor 7 and an auto-transformer 8, of the air core type, which exemplifies a high frequency air core transformer.

The switch 5 is in the form of a tube having spaced electrodes, here shown as an anode 9 and a cathode 10. These electrodes are disposed in an enclosure containing an inert gas at low pressure, as will be more fully explained later. For the present it is enough to say that the spacing of the electrodes and the character and pressure of the gas in the enclosure is such that the circuit through the switch will be maintained open for currents of normal or usual characteristics. In other words, a high resistance gap is formed between the electrodes.

For example, the current used to energize the primary 3 may have the usual voltage of 110 or 220 and a normal or usual frequency, say 60 cycles per second. The circuit of the primary normally will be maintained open by the tube switch 5, but may be closed electrically, so as to carry alternating current in both directions. This closing may be accomplished by passing through the switch in both directions an alternating current of high voltage and high frequency. This may be done by the arrangement indicated in Fig. 1. It will be understood that the expression "tube switch" as used in the claims defines a tube of the general construction and mode of operation outlined above.

Across the conductors 1 and 6 is disposed the primary 11 of a transformer and a variable resistance 12. There is also provided a conventional switch 13, which, for the purpose of illustration, may be assumed to be hand operated. The transformer of which the primary 11 is a part comprises a secondary 14 across which is placed a condenser 15. From one side of the secondary 14 leads a conductor 16 to the conductor 1 and an air gap 17 is preferably placed in this conductor 16. The other side of the secondary 14 is connected by a conductor 18 which leads to one of the coils of the auto-transformer 8, at 19. Across the conductors 1 and 6 is also placed a condenser 20, as indicated. It will be seen that this condenser is across the tube switch and the auto-transformer, as is also the primary 11, this primary being placed across the tube switch and auto-transformer in a relation which for convenience may be termed "inside" the condenser 20.

In operation, assume that the circuit through the primary 3 is open at the tube switch 5 and that it is desired to close that switch to energize the primary. Also assume that the alternating current supplied to the primary 3 is 110 v., 60 cycles, which characteristics are usual in an alternating current. Now, in order to electrically close the tube switch 5, the hand switch 13 is closed, thus permitting passage of current through the primary 11.

By the use of the air gap, condenser, and auto-transformer, the current induced in the secondary 14 is stepped up to a voltage and frequency which is high enough to break down the resistance in the tube switch 5 and thus cause this high voltage, high frequency alternating current to pass in both directions between the electrodes 9 and 10. For example, the high voltage, high frequency current resulting from the above described arrangement and operation may be on the order of 2500 v., 500,000 cycles. As soon as this current establishes a path by which it may pass in both directions across the space between the electrodes 9 and 10, then the alternating line current, which I have referred to as the usual current, may also pass in both directions across this space, following the path created for it by the high voltage, high frequency current. Since the auto-transformer 8 is of the air core type, it will carry the line current.

Naturally, the voltage and frequency of the high voltage and high frequency current will vary, being dependent upon the characteristics of the tube switch and of the circuit in general. The one voltage and frequency to which I have referred is taken only as illustrative, since any voltage and frequency which is high enough to break down the resistance of the gas between the electrodes in the tube switch is sufficient. In other words, the tube switch 5 is so designed as not to break down and permit passage of what I have referred to as the usual current, that is to say, the line current used to perform the desired work. Given the characteristics of that current, the tube switch, and the voltage and frequency of the current used to break down the resistance therein, may be readily determined by those skilled in the art.

The tube switch 5 will continue to transmit the line current so long as the hand switch 13 is maintained closed. Because of the high frequency used in what I may term the closing circuit, that is to say, the circuit used to break down the resistance in the tube switch 5, the primary 3 will act as a choke and prevent the high frequency current passing through it, forcing that current to pass through the condenser 20. In other words, the condenser 20 is what is sometimes referred to as a by-pass condenser.

Preferably, the primary 11 is designed to take only a low voltage, say, 10 v., and the other elements of the circuit are so designed that when the voltage in the primary 11 reaches that figure, the high voltage and high frequency current will break down the resistance in the tube switch 5. This current will then pass through the circuit, including the condenser 20, thus by-passing the primary 11 so that it will not be subjected to a voltage greater than that for which it is designed. It will also be understood that the condenser 20 prevents the full voltage from being impressed upon the primary 3. This condenser 20 may be of variable or adjustable capacity, if desired, although for convenience it is indicated as a non-adjustable type having a capacity suitable for the particular circuit with which it is used.

The tube switch 5 and its control by a current of high voltage and high frequency is described and claimed in the copending application of Edmund J. von Henke, Ser. No. 248,023, filed December 28, 1938. In this application, however, are disclosed and claimed certain circuits which are particularly adapted and designed for use with the invention claimed in said copending application, the circuit of Fig. 1 being particularly adapted to create the current of high voltage and high frequency required for the electrical closing of the tube switch.

In Fig. 2 I have shown what may for convenience be termed a timing and heat-control circuit, which may be used with a circuit similar to that shown in Fig. 1, in place of the hand switch 13. In Fig. 2 I have indicated by the same numerals some of the parts appearing in Fig. 1. In Fig. 2, however, the lead 2 is connected to a switch 21 shown as having an extended contact 22 which may engage either a contact 23 or the contacts 23 and 24. By engaging only the contact 23, certain parts of the circuit may be tested, whereas when engaging both contacts 23 and 24 the entire apparatus is in condition for use.

From the contact 24 leads a conductor 25 to one of the electrodes of the switch 5, the other electrode of which is connected through the auto-transformer 8 to a conductor 26 which leads to one side of the load. The lead 1 is connected to the other side of the load, which for example may be the primary 3 of a tranformer having a secondary 4, as in the circuit shown in Fig. 1.

From the contact 23 leads a conductor 27, to a terminal 28 of a timing mechanism identified generally by the numeral 29. Timing mechanisms of various kinds are well known in the art and need no detailed description. In fact the timing mechanism used at 29 may be a mechanically operated or even a hand operated one, but for the sake of convenience it is shown as an electrically operated mechanism, of a type using a synchronous motor, connected to the terminals 28 and 30.

A hand-operated switch 31 is arranged in a circuit comprising a conductor 32 leading from the terminal 30, to one side of the switch, and a conductor 33 leading from the other side of the switch to a terminal 34 on the timing mechanism. This terminal in turn is connected through the mechanism of the timer to a terminal 35 to which is connected a conductor 36 leading to the primary 37 of a transformer. The other side of this primary is connected through a resistance 38 and a conductor 39 to the conductor 27. One side of the secondary 40 of this transformer is connected by a conductor 41 to the plate of a grid glow tube 42, and the other side of the same secondary is connected by a conductor 43 through a condenser-resistor combination 71—72 to be described later to one side of the primary 11. A suitable condenser 44 is placed across the secondary 40.

The filament of the tube 42 is heated by current supplied from a transformer, the secondary 45 of which is connected to the filament, as shown, and the primary 46 of which is connected by the conductors 47 and 48 to the conductors 27 and 1, respectively. A conductor 49 leads from the conductor 48 to the terminal 30. The grid of the tube 42 is connected by a conductor 50 through a resistance 51 and a phase shifter 52 to the secondary 53 of a grid transformer, the primary of which is shown at 54 and which is energized by current from the leads 1 and 27, to which it is connected by the conductors 55 and 56 through the resistances 57, as shown.

The secondaries 45 and 53 are connected together and to one side of the primary 11, this being done by the conductor 58 leading from one of the intermediate coils of the secondary 53 to the conductor 59 which in turn connects one of the intermediate coils of the secondary 45 with the primary 11. In the conductor 59 is a hand switch 59', for a purpose which will appear later.

From the conductor 59 leads a conductor 60 through a condenser 61 and a variable resistance 62 to the conductor 43. The switch 59' is by-passed by a conductor 63 in which is a switch 64, normally closed and controlled by a relay 65. This relay is in a conductor 66 which by-passes the condenser 61 and in which is disposed a two-element rectifying tube 67 and a variable resistance 68.

Between the conductors 25 and 26 is placed a connection through a condenser 69 and a variable resistance 70. In the conductor 43 I preferably place a condenser 71 around which is placed a leak 72 with an adjustable resistance therein, both the conductor and leak being shorted by a conductor 73 in which is a normally open hand switch 74.

In operation, and assuming that the contact 22 is engaging both of the contacts 23 and 24, then a circuit will be completed from the contact 23 through the conductor 27 to the terminal 28, thence through the synchronous motor within the timing mechanism, to the terminal 30 and thence through the conductors 49 and 48, back to the lead 1, thus starting the timing mechanism. The circuit to the work is also completed except at the tube switch 5, this circuit including the contact 24, conductor 25, tube switch 5, auto-transformer 8 and conductor 26, to one side of the work, and the lead 1 to the other side of the work.

The filament of the tube 42 will be heated, since the primary 46 will be energized, the circuit through that primary following the conductors 27 and 47 to one side of the primary, and the conductor 48 from the other side thereof to the lead 1. The grid of this tube also will be energized, since a circuit has been established through the primary 54 of the grid transformer.

Now upon closing of the hand switch 31, current may pass through conductors 27 and 39 and resistance 38, to one side of the primary 37 and from the other side thereof through the conductor 36, terminals 35, 34, conductor 33, hand switch 31, conductor 32, terminal 30, and conductors 49 and 48, to the lead 1, it being remembered that the terminals 34 and 35 are connected together within the timing mechanism. The energizing of the primary 37 will induce an alternating current in the secondary 40 and the passage of that current through the tube 42 and thence through the secondary 45, conductor 59, primary 11, and conductor 43. So long as the hand switch 31 is closed, the timing mechanism will operate over a set period of time and in conjunction with the condenser 71 and leak 72 to intermittently energize the primary 37 and thus in turn intermittently energize the primary 11.

Referring now for the moment to Fig. 3, in that figure is shown an arrangement similar to that of Fig. 2, except that the tube 42 is replaced by two similar tubes 42 and 42'. The grids of these tubes are connected, through phase shifters 52 and 52', respectively, to two grid transformers comprising, respectively, the primaries 54 and 54' and the secondaries 53 and 53'. The filaments of the tubes are connected to transformers comprising, respectively, primaries 46 and 46' and secondaries 45 and 45'.

A further detailed description of the circuit of Fig. 3 is not deemed necessary, although its operation will be referred to later. For the present it is enough to say that with the circuit of Fig. 3 alternations of current will pass through the primary 11 in both directions, whereas in the circuit of Fig. 2 the single tube 42 will permit alternations of current in one direction only. Expressed in different language, it may be said that in Fig. 3 both positive and negative alternations will pass through the primary 11, whereas in the circuit of Fig. 2 only positive or negative alternations will occur, depending upon the way in which the tube 42 is connected.

In the circuit of Fig. 2, assuming that the hand switch 74 is open, then only one alternation will pass through the primary 11, after which a gap occurs until the condenser 71 is again discharged through leak 72 to permit another alternation. Similarly, in the circuit of Fig. 3, only a single alternation of current will occur when the switch 74 is open, after which an interval will occur before another alternation, of opposite sign, takes place, thus forming what for convenience may be called a cycle.

In either Fig. 2 or Fig. 3, when the switch 74 is closed and left closed, then alternations or cycles, as the case may be, will be repeated indefinitely without any gaps therebetween so long as either the switch 59' or the switch 64 is closed. This switch 59' is provided so that, if desired, the tube 67 and associated apparatus may be cut out.

With the circuits as described above, it will be seen that the operation of the tube switch 5 will be similar to that described in connection with Fig. 1. The current induced in the secondary 40 passes through the tube 42 or the tubes 42 and 42', as the case may be, and then either alternations or cycles pass through the primary 11, inducing either alternations or cycles in the secondary 14. The current thus induced is built up at the auto-transformer 8 to a sufficiently high voltage and frequency so as to break down the resistance in the tube switch 5, thus completing the circuit supplying current to the work. This current will be in the form of alternations or cycles, according to whether alternations or cycles are caused in the primary 11, it being understood that if the initial high voltage, high frequency current passes through the tube switch in alternations, then the line current can only pass through the tube switch in alternations, whereas if the initial high voltage, high frequency current passes through the tube switch in cycles, then the line current likewise will pass through the tube switch in cycles.

The condenser 69 and resistance 70 function in the same manner as the condenser 20 of Fig. 1, and the transformer 8 also acts as described in connection with Fig. 1. The primary 37 is preferably designed for the line voltage, and this primary is automatically by-passed in the same manner as the primary 11 as described in connection with Fig. 1.

In either Fig. 2 or Fig. 3, the point on the voltage curve at which the tube switch 5 is closed may be controlled by adjustment of the phase shifter 52 in Fig. 2, or the phase shifters 52 and 52' in Fig. 3.

When it is desired to provide interruptions in the flow of current, as for example when forming a series of welds in the seam, this may be done by opening the switch 74 (if not already opened) and opening the switch 59'. The operation will be described in connection with Fig. 2, wherein the result will be a series of groups of alternations, either plus or minus, separated by gaps between the groups. In Fig. 3 the result will be the same except that each group will consist of a series of cycles instead of alternations.

Assume the parts are in the position shown in Fig. 2 and that a series of alternations are passing through the primary 11, by way of the closed switch 64 in the conductor 63, charging the condenser 61. The tube 67 will prevent passage of current through the relay 65, which is in parallel with the condenser 61, until a certain predetermined voltage is built up at that condenser, and then the condenser discharge will pass through the tube 67 and energize the relay 65 to open the switch 64, causing an interruption of the current passing through the primary 11. The relay 65 is an adjustable time delay relay which may be so adjusted that it will maintain the switch 64 open for a predetermined time, after which it will permit that switch to close. Further adjustment can be had by the adjustable resistances 62 and 68.

Summing up, it will be seen that by changing the connections of the tube 42, it is possible to select for the work either a positive or a negative single alternation of current; by use of two tubes, as in Fig. 3, it is possible to obtain a single completed cycle, the single alternation or cycle being repeated at intervals as the condenser 71 discharges; by the use of the phase shifter 52 (or phase shifters 52 and 52') it is possible in any case to control the point on the voltage curve at which the passage of current begins, so as to employ the part or parts of the voltage curve best suited for the purpose at hand; by closing the switch 74 and opening the switch 59' it is possible to provide interruptions of current for the desired length of time and at the desired intervals, no matter what are the characteristics of that current; and finally the timing mechanism 29 controls the total time during which either circuit as a whole may operate.

For example, if one of the circuits is being used in a welding apparatus, the timing mechanism will fix the total time of a welding operation, whereas the other devices will control the characteristics of the welding current and interruptions therein, by controlling the passage of the high voltage and high frequency current through the tube switch 5. When the passage of that current through the tube switch is interrupted, the tube switch is "opened" electrically to interrupt the welding current. Similarly, when the tube switch is "closed" electrically, then the welding current may flow therethrough, in alternations or cycles corresponding to the alternations or cycles created by the high voltage and high frequency current.

While I have shown the invention as embodied in specific forms, it is to be understood that various changes in details may be made without departing from the scope of the invention as defined by the appended claims.

I claim:

1. In an alternating current electrical circuit a load, a tube switch in circuit with the load, said tube switch being non-conducting at the frequency and voltage of the circuit to the load, means to pass a high frequency current at high voltage through the tube switch to provide an electrical conducting path through said tube switch to permit the passage of the load current across the tube switch, said means comprising a high frequency air core transformer connected in series with the tube switch, a second transformer having a low voltage primary connected to a source of electrical energy and having a secondary connected to the high frequency air core transformer, means to increase the voltage and frequency of the current supplied to the high frequency air core transformer by the secondary of the second transformer, a control circuit for selectively causing the high frequency current to pass through the tube switch during either alternation of the alternating current or during both alternations.

2. In an alternating current electrical circuit a load, a tube switch in circuit with the load, said tube switch being non-conducting at the frequency and voltage of the circuit to the load, means to pass a high frequency current at high voltage through the tube switch to provide an electrical conducting path through said tube switch to permit the passage of the load current across the tube switch, said means comprising a high frequency air core transformer connected in series with the tube switch, a second transformer having a low voltage primary connected to a source of electrical energy and having a secondary connected to the high frequency air core transformer, means to increase the voltage and frequency of the current supplied to the high frequency air core transformer by the secondary of the second transformer, a control circuit for selectively causing the high frequency current to pass through the tube switch during either alternation of the alternating current or during both alternations, and a circuit associated with the control circuit to intermittently interrupt the passage of current through the control circuit for predetermined intervals regardless of the alternations.

3. In an alternating current electrical circuit a load, a tube switch in circuit with the load, said tube switch being non-conducting at the frequency and voltage of the circuit to the load, means to pass a high frequency current at high voltage through the tube switch to provide an electrical conducting path through said tube switch to permit the passage of the load current across the tube switch, said means comprising a high frequency air core transformer connected in series with the tube switch, a second transformer having a low voltage primary connected to a source of electrical energy and having a secondary connected to the high frequency air core transformer, means to increase the voltage and frequency of the current supplied to the high frequency air core transformer by the secondary of the second transformer, a control circuit for selectively causing the high frequency current to pass through the tube switch during either one alternation of the alternating current or during both alternations, said circuit including a pair of grid glow tubes connected to pass current alternations of opposite potential, and means to connect either or both of said grid glow tubes in the control circuit.

4. In an alternating current electrical circuit a load, a tube switch in circuit with the load, said tube switch being non-conducting at the frequency and voltage of the circuit to the load, means to pass a high frequency current at high voltage through the tube switch to provide an electrical conducting path through said tube switch to permit the passage of the load current across the tube switch, said means comprising a high frequency air core transformer connected in series with the tube switch, a second transformer having a low voltage primary connected to a source of electrical energy and having a secondary connected to the high frequency air core transformer, means to increase the voltage and frequency of the current supplied to the high frequency air core transformer by the secondary of the second transformer, a control circuit for selectively causing the high frequency current to pass through the tube switch, said circuit including a pair of grid glow tubes connected to pass current alternations of opposite potential means to connect either or both of said grid glow tubes in the control circuit, and a circuit associated with the control circuit to intermittently interrupt the passage of current through the control circuit at predetermined intervals regardless of the alternations.

5. In an alternating current electrical circuit a load, a tube switch in circuit with the load, said tube switch being non-conducting at the frequency and voltage of the circuit to the load, means to pass a high frequency current at high voltage through the tube switch to provide an electrical conducting path through said tube switch to permit the passage of the load current across the tube switch, said means comprising a high frequency air core transformer connected in series with the tube switch, a second transformer connected in series with the tube switch, a second transformer having a low voltage primary connected to a source of electrical energy and having a secondary connected to the high frequency air core transformer, means to increase the voltage and frequency of the current supplied to the high frequency air core transformer by the secondary of the second transformer, a control circuit for selectively causing the high frequency current to pass through the tube switch, said circuit including a pair of grid glow tubes connected to pass current alternations of opposite potential, means to connect either or both of said grid glow tubes in the control circuit, and a circuit associated with the control circuit to intermittently interrupt the passage of current through the control circuit at predetermined intervals regardless of the alternations, said circuit including a switch operated by a time delay relay.

6. In an alternating current electrical circuit a load connected across the circuit, a tube switch connected in series with the load, said tube switch being non-conducting at the frequency and voltage of the load current, means for passing the high frequency current at high voltage through the tube switch whereby an electrical path across the tube switch will be provided for the load current, said means including a control circuit for selectively causing the high frequency current to pass through the tube switch during either alternation of the alternating current only or during both alternations and a circuit associated with the control circuit to intermittently interrupt the passage of current through the control circuit at predetermined intervals regardless of the alternations.

7. In an alternating current electrical circuit a load connected across the circuit, a tube switch connected in series with the load, said tube switch being non-conducting at the frequency and voltage of the load current, means for passing the high frequency current at high voltage through the tube switch whereby an electrical path across the tube switch will be provided for the load current, said means including a control circuit for selectively causing the high frequency current to pass through the tube switch during either alternation of the alternating current only or during both alternations and a circuit associated with the control circuit to intermittently interrupt the passage of current through the control circuit at predetermined intervals regardless of the alternations, and means controlling the over-all time for the operation of the control circuit and its associated circuit.

8. In an alternating current electrical circuit a load connected across the circuit, a tube switch connected in series with the load, said tube switch being non-conducting at the frequency and voltage of the load current, means for passing the high frequency current at high voltage through the tube switch whereby an electrical path across the tube switch will be provided for the load current, said means including a control circuit for selectively causing the high frequency current to pass through the tube switch during either alternation of the alternating current only or during both alternations, said circuit including a pair of grid glow tubes each connected to pass current of opposite polarity and a circuit associated with the control circuit to intermittently interrupt the passage of current through the control circuit at predetermined intervals regardless of the alternations, said circuit including a time delay relay controlled by a rectifying tube.

ARTHUR A. GROTHE.